(12) United States Patent
Reyes et al.

(10) Patent No.: US 10,019,175 B2
(45) Date of Patent: Jul. 10, 2018

(54) MANAGING PROGRAM ACCESS TO DATA STORAGE RESOURCES

(71) Applicant: International Business Machines Corporation, Armonk, NY (US)

(72) Inventors: Sergio Reyes, Austin, TX (US); Brian C. Twichell, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/252,441

(22) Filed: Aug. 31, 2016

(65) Prior Publication Data

US 2018/0059957 A1 Mar. 1, 2018

(51) Int. Cl.
*G06F 3/06* (2006.01)

(52) U.S. Cl.
CPC .......... *G06F 3/0611* (2013.01); *G06F 3/0635* (2013.01); *G06F 3/0659* (2013.01); *G06F 3/0673* (2013.01)

(58) Field of Classification Search
None
See application file for complete search history.

(56) References Cited

U.S. PATENT DOCUMENTS

| | | | |
|---|---|---|---|
| 7,734,889 B1 * | 6/2010 | Todd | G06F 3/0607 711/108 |
| 8,281,033 B1 * | 10/2012 | Riordan | G06F 3/061 709/231 |
| 8,627,015 B2 | 1/2014 | Durocher et al. | |
| 9,191,330 B2 | 11/2015 | Clark et al. | |
| 9,262,087 B2 | 2/2016 | Chaurasia et al. | |
| 2014/0115252 A1 * | 4/2014 | Yu | G06F 3/0611 711/113 |
| 2014/0359212 A1 | 12/2014 | Oyama et al. | |
| 2015/0242134 A1 | 8/2015 | Takada et al. | |
| 2015/0269098 A1 * | 9/2015 | Sugihara | G06F 13/18 711/158 |
| 2015/0324126 A1 | 11/2015 | Nakajima | |

(Continued)

OTHER PUBLICATIONS

Gojmerac et al., "Adaptive Multipath Routing Based on Local Distribution of Link Load Information", QofIS 2003, LNCS 2811, pp. 122-131(10 pages), 2003, Copyright Springer-Verlag Berlin Heidelberg 2003.

(Continued)

*Primary Examiner* — Edward J Dudek, Jr.
*Assistant Examiner* — Ralph A Verderamo, III
(74) *Attorney, Agent, or Firm* — Pooya Shoghi Ghalehshabi; Isaac J. Gooshaw

(57) ABSTRACT

A computer-implemented method comprises identifying a storage subsystem comprising one or more storage address units and associated with one or more access interfaces; identifying an address-interface correlation conclusion; and identifying a target address unit identification associated with at least of the one or more storage address units. The computer-implemented method further comprises determining a target interface conclusion associated with at least one of the one or more access interfaces based on the address-interface correlation guideline and the target address unit identification. A corresponding computer program product and computer system are also disclosed.

14 Claims, 4 Drawing Sheets

(56) References Cited

U.S. PATENT DOCUMENTS

2016/0050145 A1* 2/2016 Tsirkin ................. H04L 45/745
                                                              718/105
2016/0308765 A1* 10/2016 Le ........................ H04L 45/742

OTHER PUBLICATIONS

Villamizar, Curtis, "OSPF Optimized Multipath (OSPF-OMP)", Internet Engineering Task Force, Internet Draft, draft-ietf-ospf-omp-02, UUNET, Feb. 24, 1999, 38 pages.

* cited by examiner

MANAGING PROGRAM ACCESS TO DATA STORAGE RESOURCES

BACKGROUND

The present invention relates generally to the field of storage systems, and more particularly to managing storage resource access in those systems.

In storage systems, managing access (i.e., input and output) to storage resources is important for maintaining the efficiency and reliability of those systems. In such systems, methods of distributing access routes to different requesting programs can have consequences on how fast programs are able to retrieve or store data on the storage system, as well as how reliable such data is upon retrieval or storage. The developers and users of storage systems continue to face challenges with methods of managing access to storage resources in those systems.

SUMMARY

A computer-implemented method comprises identifying a storage subsystem comprising one or more storage address units and associated with one or more access interfaces; identifying an address-interface correlation conclusion; and identifying a target address unit identification associated with at least of the one or more storage address units. The computer-implemented method further comprises determining a target interface conclusion associated with at least one of the one or more access interfaces based on the address-interface correlation guideline and the target address unit identification. A corresponding computer program product and computer system are also disclosed.

DETAILED DESCRIPTION

Figure 1:
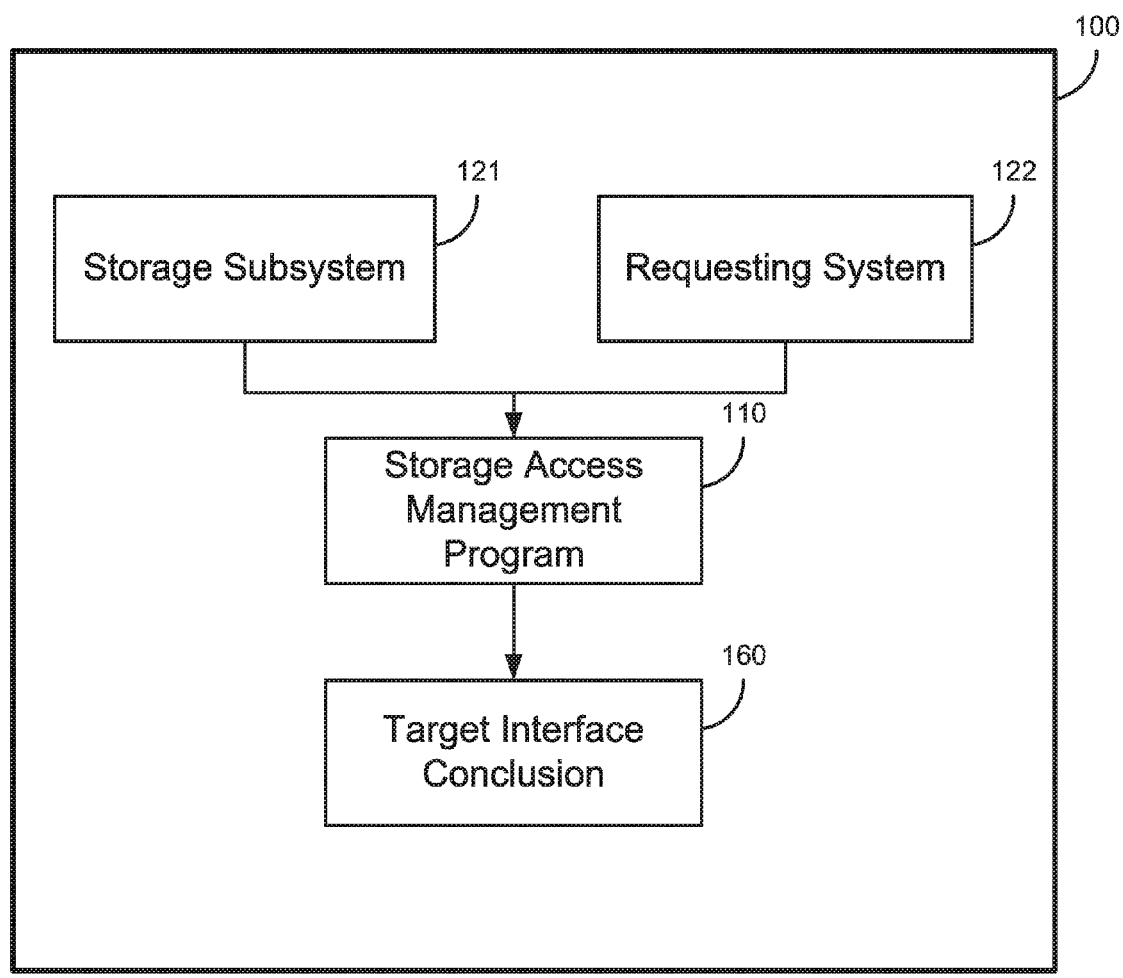
FIG. 1 is a block diagram of one embodiment of a computer system environment suitable for operation of a storage access management program, in accordance with at least one embodiment of the present invention.

FIG. 1 is a computer system environment 100 suitable for operating a storage access management program 110, in accordance with at least one embodiment of the present invention. In the computer system environment depicted in FIG. 1, the program 110 communicates with a storage subsystem 121 and a requesting system 122 to determine a target interface conclusion 160. In at least some embodiments, a storage subsystem 121 is any combination of one or more computer components that enable storage and retrieval of data. In at least some embodiments, the storage subsystem 121 comprises one or more storage address units and is associated with one or more access interfaces. In at least some embodiments, a storage address unit is a unit of data storage in a storage subsystem 121. In at least some embodiments, an access interface is a combination of one or more computer components that allow retrieval of data stored in the one or more storage address units. In at least some embodiments, a requesting system 122 is any computer system that requests at least one access operation (i.e., storage and/or retrieval of data) from the storage subsystem 121. In at least some embodiments, a target interface conclusion 160 is a conclusion about which set of one or more access interfaces should be used to access a specific set of one or more storage address units.

Figure 2:
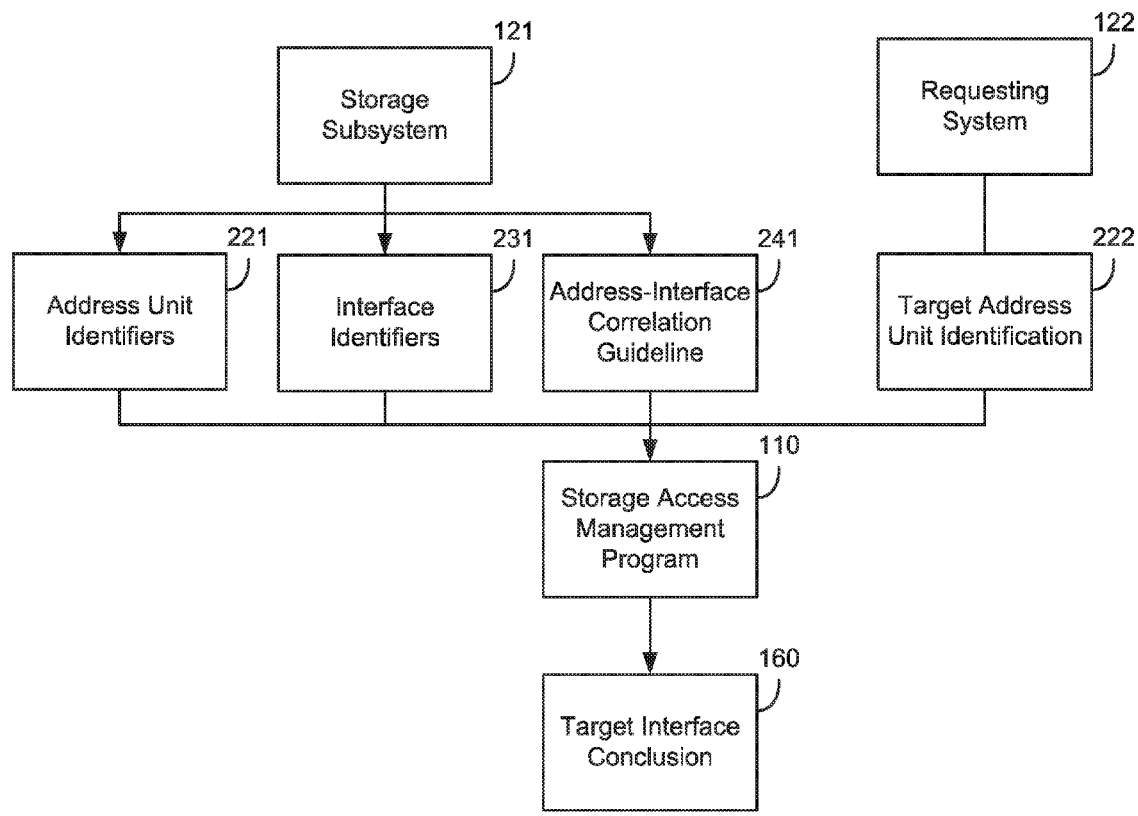
FIG. 2 is a data flow diagram of a storage access management program, in accordance with at least one embodiment of the present invention.

FIG. 2 is a data flow diagram of a storage access management program 110, in accordance with at least one embodiment of the present invention. In the embodiment depicted in FIG. 2, the program 110 receives data artefacts identifying the one or more storage address units (i.e., the one or more address unit identifiers 221) and the one or more access interfaces (i.e., the one or more interface identifiers 231) from the storage subsystem 121. The program 110 also receives one or more address-interface correlation guidelines 241 from the storage subsystem 121. In at least some embodiments, an address-interface correlation guideline 241 is a combination of one or more rules about which set of one or more access interfaces should be used to access a specific set of one or more storage address units.

In the embodiment depicted in FIG. 2, the storage access management program 110 receives a target address unit identification 222 from the requesting system 122. In at least some embodiments, the target address unit identification 222 is an indication of which set of one or more storage address units the requesting system 122 requests to access. In at least some embodiments, the program 110 uses the address-interface correlation guideline 241 to determine which of the one or more access interfaces the requesting system 122 should use to access its requested set of one or more storage access units (i.e., the program determines a target interface conclusion 160 associated with the target address unit identification 222).

Figure 3:
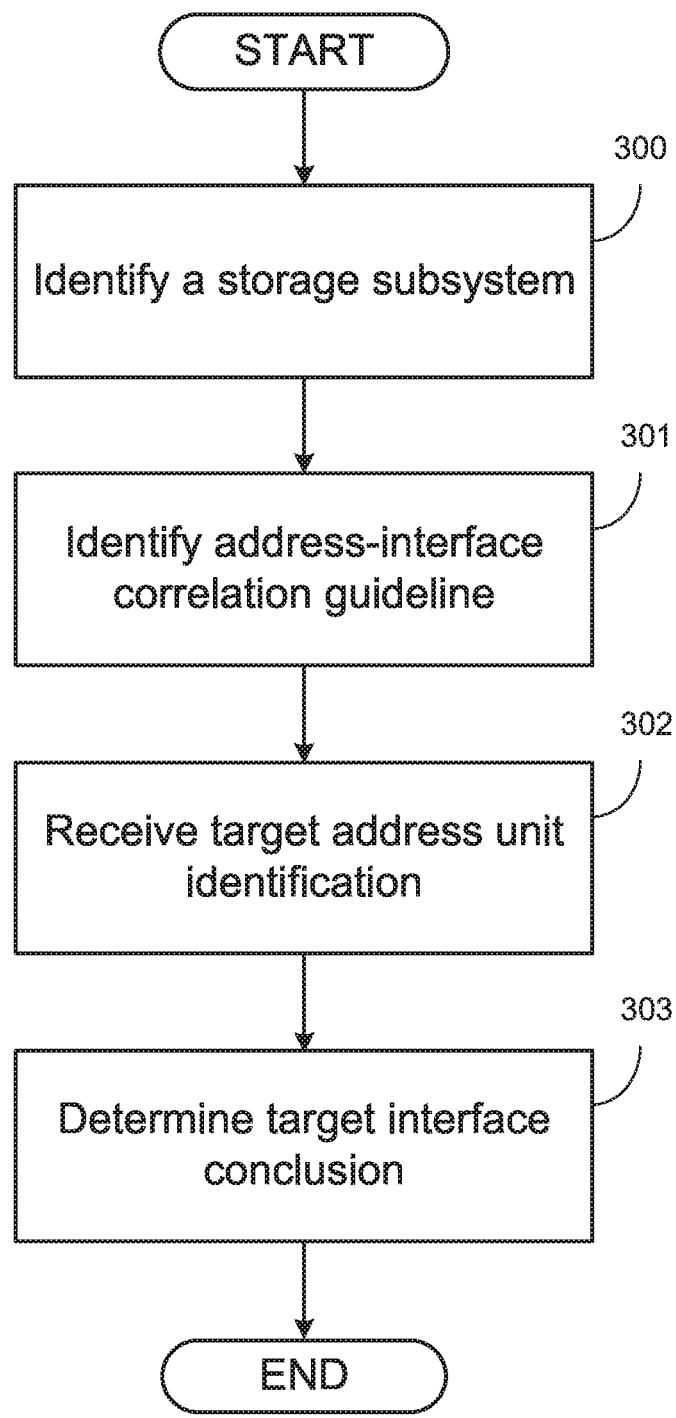
FIG. 3 is a flowchart diagram of a storage access management program, in accordance with at least one embodiment of the present invention.

FIG. 3 is a flow-chart diagram of a storage access management program, in accordance with at least one embodiment of the present invention. At step 300, the program identifies a storage subsystem comprising one or more storage address units and associated with one or more access interfaces. At step 301, the program identifies an address-interface correlation conclusion. At step 302, the program identifies a target address unit identification associated with at least of the one or more storage address units. At step 303, the program determines a target interface conclusion associated with at least one of the one or more access interfaces based on the address-interface correlation guideline and the target address unit identification.

The storage access management program identifies a storage subsystem at step 300. In at least some embodiments, the storage subsystem comprises one or more storage address units and is associated with one or more access interfaces. In some embodiments, each of the one or more access interfaces is associated with at least one networking hop. In at least some embodiments, a networking hop is any portion of a path between a source and a destination in a network (e.g., a computer system in such a path). In some embodiments, each of the one or more access interfaces is associated with a cache component. In at least some embodiments, a cache is any combination of one or more computer components capable of storing data (e.g., used to enable faster retrieval of data). In some embodiments, the program identifies the storage subsystem by communicating one or more messages with the storage subsystem. In some embodiments, the program identifies the storage subsystem using one or more preexisting configuration information available to the program.

The storage access management program identifies an address-interface correlation conclusion at step 301. In some embodiments, the address-interface correlation guideline is determined based on a hash function. In some embodiments, the hash function is determined based on the target address unit identification and a count of the one or more access interfaces (i.e., an indication of how many access interfaces exist). In some embodiments, the hash function consists of the following function: Hash(storage_address)=(storage_address/storage_interface_count) modulus (storage_interface_count). In the noted function, the hash value associated with a storage address unit is determined by the result of the modulus of the result of the division of the numerical identifier of the address of the storage address unit (noted as storage_address) and the count of the one or more access interfaces with the count of the one or more access interfaces. In some embodiments, the hash function may be in other forms. In some embodiments, the address-interface correlation guideline is determined based on one-to-one correlations between the one or more storage address units and the one or more access interfaces. In some embodiments, the address-interface correlation guideline is determined based on one-to-many and/or many-to-many correlations between the one or more storage address units and the one or more access interfaces.

The storage access management program receives a target address unit identification at step 302. In some embodiments, the target address unit identification is an identification of a set of one or more storage address units that a requesting system needs to access. In some embodiments, the target address unit identification is an identification of at least one property (i.e., type, urgency, classification identifier) associated with the data requested by a requesting system, and the program analyzes the at least one property to determine the set of one or more storage address units that need to be accessed. In some embodiments, the program receives the target address unit identification from a requesting system. In some embodiments, the program receives the target address unit identification from at least one computer system acting as intermediary between a requesting system and the computer system on which the program resides and/or is implemented.

The storage access management program determines a target interface conclusion at step 303. In some embodiments, the program determines the target interface conclusion based on at least one information artefact received from at least one other computer (hardware and/or software) component. In some embodiments, the program determines the target interface conclusion based on at least one predetermined information and/or guidelines provided to the program, directly or indirectly, by at least one user of the computer system environment within which the program is located.

In some embodiments, the storage access management program determines an access path associated with the target address unit identification based on the target interface conclusion. In some embodiments, an access path associated with the target address unit identification is an ordered combination of one or more steps that (e.g., comprising of accessing one or more hops) lead to accessing the one or more storage address units identified by the target address unit identification. In some embodiments, the storage access management program operates as part of a computer program managing the storage of data on at least one computer system (e.g., an operating system). In some embodiments, the program operates as a stand-alone program communicating with other programs and making recommendations about how to manage access to storage resources.

Embodiments of the present invention reduce the overhead in maintaining cache coherency for I/O interfaces in enterprise storage systems. Enterprise storage subsystems typically have multiple integrated I/O interfaces, providing access to the same physical non-volatile storage. Each of these multiple I/O interfaces have access to small amounts of non-shared cache to improve write operation performance. The cache per I/O interface feature incurs performance penalties ensuring that there is at most one instance of a non-volatile storage block cached across all I/O interfaces. The performance overhead is most noticeable in scenarios where write I/O operations are repeatedly issued to the same block address, but the I/O requests are distributed across multiple I/O interfaces, which is a typical behavior for the existing round-robin multipath algorithm typically utilized by many operating systems for I/O distribution. Embodiments of the present invention reduce such overhead and as such increase the efficiency of the enterprise storage systems. Nevertheless, the aforementioned advantages are not required to be present in all of the embodiments of the invention and may not be present in all of the embodiments of the invention.

In some embodiments, the storage access management program operates as part of a software development platform, while in other embodiments the storage access management program is part of an stand-alone software component that communicates with the a software development platform and/or can be optionally added as an add-on program to the software development platform. In general, one or more steps associated with different embodiments of the storage access management program may be performed based on one or more pieces of information obtained directly or indirectly from one or more computer (hardware or software) components, one or more pieces of information obtained directly or indirectly from one or more inputs from one or more users, and/or one or more observed behaviors associated with one or more (hardware or software) components of one or more computer system environments. In general, one or more steps of different embodiments of the storage access management program may comprise communicating with one or more computer (hardware or software) components, issuing one or more computer instructions (e.g., one or more special purpose machine-level instructions defined in the instruction set of one or more computer hardware components), and/or communicating with one or more computer components at the hardware level.

Figure 4:
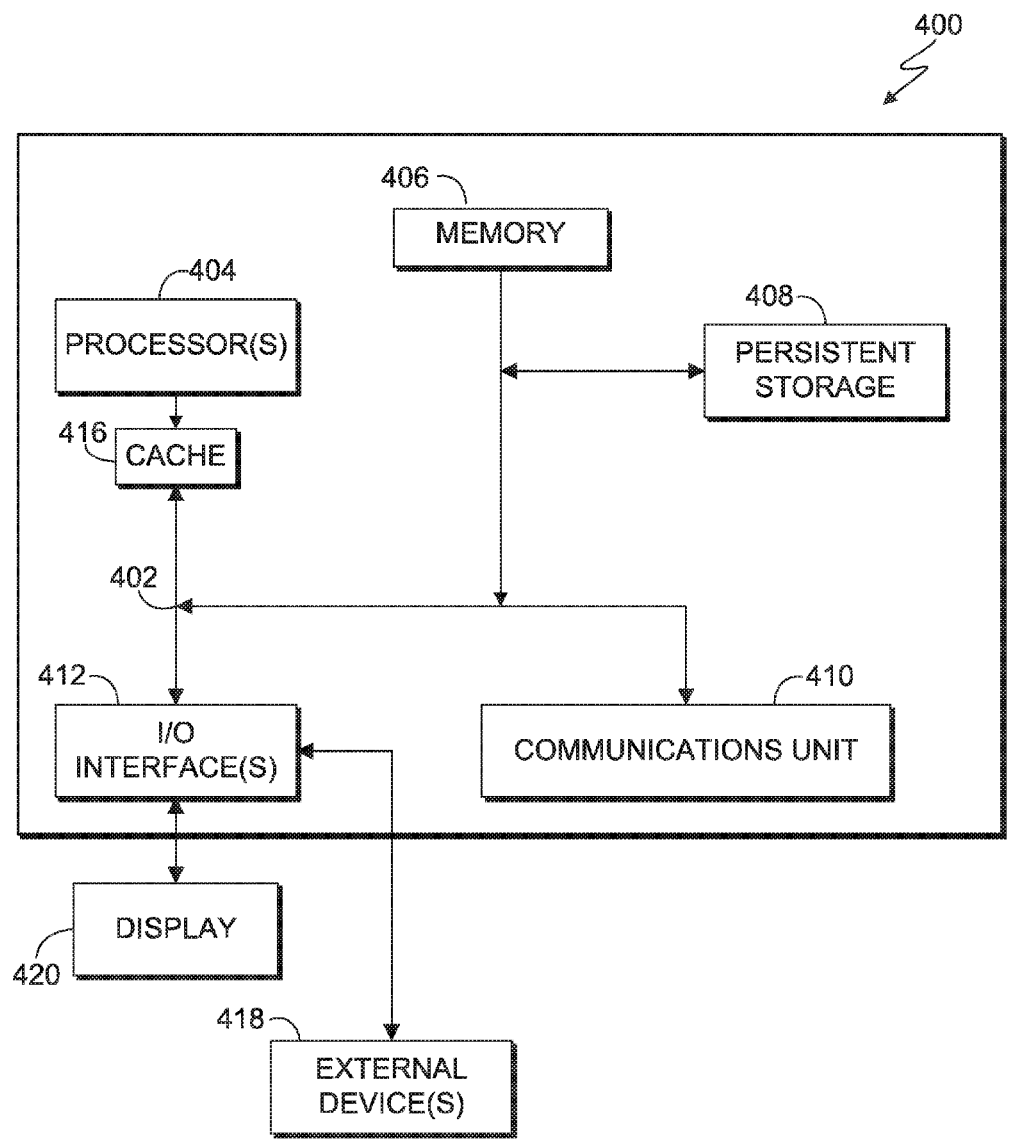
FIG. 4 is a block diagram of a computing apparatus suitable for executing a storage access management program, in accordance with at least one embodiment of the present invention.

FIG. 4 is a block diagram depicting components of a computer 400 suitable for executing the storage access management program. FIG. 4 displays the computer 400, the one or more processor(s) 404 (including one or more computer processors), the communications fabric 402, the memory 406, the RAM, the cache 416, the persistent storage 408, the communications unit 410, the I/O interfaces 412, the display 420, and the external devices 418. It should be appreciated that FIG. 4 provides only an illustration of one embodiment and does not imply any limitations with regard to the environments in which different embodiments may be implemented. Many modifications to the depicted environment may be made.

As depicted, the computer 400 operates over a communications fabric 402, which provides communications between the cache 416, the computer processor(s) 404, the memory 406, the persistent storage 408, the communications unit 410, and the input/output (I/O) interface(s) 412. The communications fabric 402 may be implemented with any architecture suitable for passing data and/or control information between the processors 404 (e.g., microprocessors, communications processors, and network processors, etc.), the memory 406, the external devices 418, and any other hardware components within a system. For example, the communications fabric 402 may be implemented with one or more buses or a crossbar switch.

The memory 406 and persistent storage 408 are computer readable storage media. In the depicted embodiment, the memory 406 includes a random access memory (RAM). In general, the memory 406 may include any suitable volatile or non-volatile implementations of one or more computer readable storage media. The cache 416 is a fast memory that enhances the performance of computer processor(s) 404 by holding recently accessed data, and data near accessed data, from memory 406.

Program instructions for the storage access management program may be stored in the persistent storage 408 or in memory 406, or more generally, any computer readable storage media, for execution by one or more of the respective computer processors 404 via the cache 416. The persistent storage 408 may include a magnetic hard disk drive. Alternatively, or in addition to a magnetic hard disk drive, the persistent storage 408 may include, a solid state hard disk drive, a semiconductor storage device, read-only memory (ROM), electronically erasable programmable read-only memory (EEPROM), flash memory, or any other computer readable storage media that is capable of storing program instructions or digital information.

The media used by the persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of the persistent storage 408.

The communications unit 410, in these examples, provides for communications with other data processing systems or devices. In these examples, the communications unit 410 may include one or more network interface cards. The communications unit 410 may provide communications through the use of either or both physical and wireless communications links. The storage access management program may be downloaded to the persistent storage 408 through the communications unit 410. In the context of some embodiments of the present invention, the source of the various input data may be physically remote to the computer 400 such that the input data may be received and the output similarly transmitted via the communications unit 410.

The I/O interface(s) 412 allows for input and output of data with other devices that may operate in conjunction with the computer 400. For example, the I/O interface 412 may provide a connection to the external devices 418, which may include a keyboard, keypad, a touch screen, and/or some other suitable input devices. External devices 418 may also include portable computer readable storage media, for example, thumb drives, portable optical or magnetic disks, and memory cards. Software and data used to practice embodiments of the present invention may be stored on such portable computer readable storage media and may be loaded onto the persistent storage 408 via the I/O interface(s) 412. The I/O interface(s) 412 may similarly connect to a display 420. The display 420 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method comprising:
   identifying a storage subsystem, said storage subsystem comprising one or more storage address units and being associated with one or more access interfaces;
   identifying an address-interface correlation guideline, wherein said address-interface correlation guideline is determined based on a hash function consisting of the following function:

$$\text{Hash(storage\_address)}=(\text{storage\_address}/\text{storage\_interface\_count})\text{modulus}(\text{storage\_interface\_count});$$

receiving a target address unit identification, said target address unit identification being associated with at least one of said one or more storage address units; and
   determining a target interface conclusion based on said address-interface correlation guideline and said target address unit identification, said target interface correlation conclusion being associated with at least one of said one or more access interfaces.

2. The computer-implemented method of claim 1, wherein said hash function is determined based on said target address unit identification and a count of said one or more access interfaces.

3. The computer-implemented method of claim 1, further comprising:
   determining an access path based on said target interface conclusion, said access path being associated with said target address unit identification.

4. The computer-implemented method of claim 1, wherein each of said one or more access interfaces is associated with a cache component.

5. The computer-implemented method of claim 1, wherein said address-interface correlation guideline is determined based on one-to-one correlations between said one or more storage address units and said one or more access interfaces.

6. A computer program product, comprising one or more computer readable storage media and program instructions stored on said one or more computer readable storage media, said program instructions comprising instructions to:
   identify a storage subsystem, said storage subsystem comprising one or more storage address units and being associated with one or more access interfaces;
   identify an address-interface correlation guideline, wherein said address-interface correlation guideline is determined based on a hash function consisting of the following function:

$$\text{Hash(storage\_address)}=(\text{storage\_address}/\text{storage\_interface\_count})\text{modulus}(\text{storage\_interface\_count});$$

receive a target address unit identification, said target address unit identification being associated with at least one of said one or more storage address units; and
   determine a target interface conclusion based on said address-interface correlation guideline and said target address unit identification, said target interface correlation conclusion being associated with at least one of said one or more access interfaces.

7. The computer program product of claim 6, wherein said hash function is determined based on said target address unit identification and a count of said one or more access interfaces.

8. The computer program product of claim 6, wherein program instructions further comprise instructions to:
 determine an access path based on said target interface conclusion, said access path being associated with said target address unit identification.

9. The computer program product of claim 6, wherein each of said one or more access interfaces is associated with a cache component.

10. The computer program product of claim 6, wherein said address-interface correlation guideline is determined based on one-to-one correlations between said one or more storage address units and said one or more access interfaces.

11. A computer system comprising:
 a processor;
 one or more computer readable storage media;
 computer program instructions;
 said computer program instructions being stored on said one or more computer readable storage media; and
 said computer program instructions comprising instructions to:
  identify a storage subsystem, said storage subsystem comprising one or more storage address units and being associated with one or more access interfaces;
  identify an address-interface correlation guideline, wherein said address-interface correlation guideline is determined based on a hash function consisting of the following function:

Hash(storage_address)=(storage_address/storage_interface_count)modulus(storage_interface_count);

receive a target address unit identification, said target address unit identification being associated with at least one of said one or more storage address units; and
  determine a target interface conclusion based on said address-interface correlation guideline and said target address unit identification, said target interface correlation conclusion being associated with at least one of said one or more access interfaces.

12. The computer system of claim 11, wherein said hash function is determined based on said target address unit identification and a count of said one or more access interfaces.

13. The computer system of claim 11, wherein computer program instructions further comprise instructions to:
 determine an access path based on said target interface conclusion, said access path being associated with said target address unit identification.

14. The computer system of claim 11, wherein each of said one or more access interfaces is associated with a cache component.

* * * * *